United States Patent [19]

Levine et al.

[11] 4,389,587

[45] Jun. 21, 1983

[54] UNITARY SLEEVING INSULATION

[75] Inventors: Herbert R. Levine, Dover; L. Gerard Landry, Somersworth, both of N.H.

[73] Assignee: United Technologies Corporation, Hartford, Conn.

[21] Appl. No.: 324,307

[22] Filed: Nov. 23, 1981

[51] Int. Cl.³ .............................................. H02K 3/04
[52] U.S. Cl. ..................................... 310/208; 310/43; 138/140; 138/DIG. 2
[58] Field of Search ................. 310/43, 208, 260, 270; 138/124, 125, 140, 141, 145, 149, DIG. 2

[56] References Cited

U.S. PATENT DOCUMENTS 3,901,281 8/1975 Morrisey .............................. 138/140
4,112,183 9/1978 Smith .................................... 310/208

Primary Examiner—Donovan F. Duggan
Assistant Examiner—Anita M. Ault
Attorney, Agent, or Firm—Harry J. Gwinnell

[57] ABSTRACT

An improved high dielectric strength unitary insulation sleeving is described. The insulation sleeving comprises an inner insulating layer such as woven fiberglass overcoated with an insulation resin such as an acrylic resin, having an additional insulating layer such as fiberglass overbraided upon it. The overbraided layer is secured to the inner resin-sleeving member by means of an additional impregnation with an electrically insulating binder resin, such as acrylic, to secure the composite together. This material, in addition to having the requisite mechanical and electrical properties for use on coil leads, is specifically adapted to VPI processing and can be utilized reliably with minimal effort. For example, the material has comparable and, in some instances, superior dielectric breakdown voltages as compared to conventionally used sleeving and is not subject to layer slippage which can decrease electrical properties, as can occur with conventionally used materials.

5 Claims, 2 Drawing Figures

UNITARY SLEEVING INSULATION

DESCRIPTION

1. Technical Field

The field of art to which this invention pertains is electrically insulated conductors and specifically insulation sleeving for such conductors.

2. Background Art

With a view towards cost saving and efficiency in manufacturing, in recent years, the use of a vacuum pressure impregnation (VPI) of insulating resin for form wound motor coils has become increasingly prevalent. In a typical VPI process, previously insulation-wrapped coil, either individually or in a stator, is processed by: (a) preheating it; (b) subjecting it to a vacuum for a predetermined period of time; (c) introducing the insulating resin in liquid form into the coil under vacuum; (d) increasing the pressure on the coil in the presence of the liquid resin until it substantially impregnates the coil; (e) releasing the pressure and draining off any resin which does not so impregnate; and (f) baking the impregnated coil.

The use of such impregnation method is intended to introduce the impregnating insulating resin into all the existing interstices of the coil and insulating coil wrapping, since unimpregnated areas result in voids which cause increased dielectric breakdowns or lower dielectric breakdown voltages.

Since the junction points at which the coil leads are brazed to the form wound coil must be insulated, many manufacturers have been using multiple layers of sleeving to obtain such insulation. Typically, either one of two combinations is used to insulate this junction point and the lead itself: either a heat treated fiberglass sleeving placed over Grade A acrylic resin coated fiberglass sleeving (by American Society for Testing and Materials (ASTM) D 372 standards sleeving which can withstand 7000 volts average impressed voltage without breakdown), or heat treated fiberglass sleeving placed over two lengths of Grade A acrylic resin coated fiberglass sleeving which previously have been "telescoped" (inserted one into the other).

Although these methods of insulating the junction points are very labor intensive as well as relying heavily on operator skill and conscientiousness, if a VPI process is used, there has been very little alternative to this telescoping method. It has not been possible to use a single Grade A acrylic resin coated sleeving because the insulating impregnating resin does not adhere sufficiently to the acrylic resin coated sleeving to insulate adequately the coil lead. It has therefore been necessary to add a layer of heat treated, uncoated fiberglass sleeving to the lead insulation to which the VPI insulating resin would readily adhere, in order to obtain a final sleeving insulation which provides adequate mechanical as well as electrical protection.

Accordingly, what is needed in this art is an insulation material specifically adapted to coil leads which are connected to form wound coils to be processed by a VPI process, which in addition to providing adequate mechanical and electrical properties, provides a method of insulating such leads which is not highly labor intensive and which does not rely heavily on operator skill and conscientiousness.

DISCLOSURE OF INVENTION

The present invention is directed to a unitary electrical insulating sleeving which allows coil manfacturers to use only a unitary length of sleeving to insulate electrical leads without having to resort to multiple steps such as the telescoping of several lengths of sleeving to attain adequate mechanical as well as electrical protection. The sleeving according to the present invention comprises an electrically insulating inner layer, such as fiberglass, overcoated with an electrically insulating polymer. The polymer coated sleeving has a second insulating sleeving overbraided upon it. The overbraided sleeving is securely bonded to the inner insulating layer by means of a polymeric binder in such amounts and so disposed as to prevent slippage of the overbraided sleeving and minimize fray. The unitary insulating sleeving according to the present invention, in addition to having requisite mechanical and electrical properties for use on such coil leads specifically adapted to VPI processing can also be utilized reliably with minimal effort.

The foregoing, and other features and advantages of the present invention, will become more apparent from the following description and accompanying drawing.

BEST MODE FOR CARRYING OUT THE INVENTION

Figure 1:
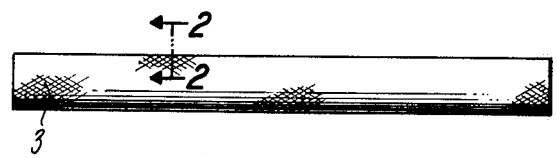
FIG. 1 shows typical unitary insulation sleeving according to the present invention.
Figure 2:
FIG. 2 is a cross-section of the sleeving of FIG. 1 taken along the line 2—2 of FIG. 1.

In FIG. 2 the inner insulating layer 1 which can be fiberglass or other electrically insulating tubular material is overcoated with an insulating polymer 2 such as alkyl esters of acrylic acids and the thus coated tubular shaped material is then overbraided with an insulating sleeving 3 such as fiberglass. The binder material 4 which fixes the sleeving to the inner resin layer is impregnated into the sleeving. The outer insulating sleeving 3 is also shown in FIG. 1.

As the inner insulating material 1, any conventionally used insulating material may be used according to the present invention, although electrical grade fiberglass braided sleeving meeting the requirements of National Electrical Manufacturing Association Standard No. VS1, is preferred. Other materials which may be used are knitted and braided sleeving made from organic fibers such as rayon, polyester, nylon, aramid and cotton.

Once the inner insulation layer has been selected, it is then coated primarily on its exterior surface with an electrically insulating polymeric material. Materials particularly suitable for use according to the present invention include water based acrylic polymers such as BF Goodrich 2600 X138, 2600 X91, 2600 X84, 2600 X172, 2600 X136, 2679, 2671, and mixtures thereof; Rohm & Haas AC658, AC604, E358, E1683, and mixtures thereof. Examples of other polymers which also may be used include silicone resins and rubbers, vinyl resins such as polyvinyl chloride and vinyl chloride-vinyl acetate copolymers, polyurethanes, epoxy resins, polyesters, polyimides, polysulfones, polyamide-imides and mixtures thereof. This material can be applied by any conventional method such as dipping, spraying, brushing, etc. For ease of application both in manufacturing and use, it is preferred that the resin material be applied only to the exterior of the inner insulation layer. The thickness of the inner insulation layer is generally about 0.008 inch to 0.050 inch (0.02 cm to 0.13 cm) thick and the polymeric coating thickness is generally 0.005 inch to 0.030 inch (0.013 cm to 0.076 cm) thick. The function of the resin overcoating is to improve the electrical and/or thermal properties of the inner insulation layer.

Once the inner composite has been constituted, a second insulating sleeving is overbraided (by conventional means) upon it. It should be noted, however, that while this operation is described in terms of "overbraiding", any conventional textile process of constructing such sleeving can be used. The thickness of this sleeving is generally from 0.008 inch to 0.050 inch (0.02 cm to 0.13 cm) thick. The primary function of this second sleeving is to provide the needed flexibility at the time of application of the unitary sleeving to the coil leads and to provide a particularly suitable substrate to which the VPI resin can thoroughly impregnate and adhere in subsequent processing.

At this point, a step key to the present invention is performed where the thus formed sleeving is impregnated with a polymeric binder to secure the sleeving into a unitary composite. While any compatible binder can be used (note the polymers described below), the above described acrylic binders are particularly preferred. The binder is impregnated into the overbraided sleeving by any conventional techniques such as dipping, brushing, or spraying, and used in such amounts to secure the overbraiding to the rest of the composite without producing an overly stiff product. Amounts such as 0.5% to 25% by weight based on total weight of the unitary insulating sleeving can be used.

EXAMPLE 1

A woven fiberglass inner insulation layer having a 0.182 inch to 0.198 inch (0.462 cm. to 0.503 cm.) inner diameter was overcoated with a heat reactive acrylic latex polymer cured to a thickness of about 12 to about 20 mils followed by overbraiding with ECG-150 ⅝ fiberglass to provide a Grade A acrylic resin coated fiberglass sleeving. This article was then immersed in the same acrylic resin to a final dry resin pick-up of about 1% by weight based on total weight of product, thus forming a secure unitary insulation sleeving.

EXAMPLE 2

The same procedure as in Example 1 was followed except for the fiberglass overbraiding where a larger diameter yarn was used (ECG-150 ¾), and the bonding resin pick-up was increased from the about 1% of Example 1 to about 2% in this example. The material of Example 1 can be considered a "Light Wall" material and the material of the Example 2 can be considered a "Heavy Wall" material.

EXAMPLE 3

A 0.032 inch (0.081 cm) thick wall heat treated, uncoated fiberglass sleeving was slipped over the same woven fiberglass inner insulation layer as described in Example 1, the diameter of the heat treated, uncoated fiberglass sleeving being 0.182 inch to 0.198 inch (0.462 cm. to 0.503 cm.)

EXAMPLE 4

A Grade A acrylic resin coated fiberglass sleeving as described in Example 1 was placed inside a Grade A acrylic resin coated sleeving of the same type having an inner diameter of 0.258 inch to 0.278 inch (0.655 cm. to 0.706 cm.). The two-layer composite article was next placed inside a standard wall (wall thickness of 0.012 in. to 0.020 in., 0.03 cm. to 0.05 cm) heat treated uncoated fiberglass sleeving having an inner diameter of 0.258 in. to 0.278 in. (0.655 cm. to 0.706 cm.).

In order to compare the relative dielectric strengths (breakdown voltages) of the conventional multiple length sleevings of Examples 3 and 4 with the Light Wall and Heavy Wall high dielectric strength unitary insulating sleeving according to the present invention, the following experiment was performed. Five specimens of sleeving made according to the above four examples were prepared. The samples were placed on a length of 0.166 in. by 0.166 in., 0.422 cm. by 0.422 cm. (coated dimensions) GP-200 formed magnet wire produced by Essex Group, Inc., Magnet Wire & Insulation Division. This wire simulates the coil leads the sleeving insulates in use, and also serves as one of the electrodes in the dielectric breakdown voltage test. All specimens were 6 inches (15.24 cm.) long. The twenty prepared specimens were placed in a holder, preheated at 65° C. for one-half hour, and then subjected to the following procedure to duplicate the conditions the specimens would be subjected to under conventional VPI processing. The specimen holder was placed in a vacuum pressure impregnation tank and subjected to a vacuum of twenty inches (50.8 cm) mercury and held there for 30 minutes. General Electric Company's polyester varnish system 708A/709A (1:1 ratio by weight) catalyzed with GE catalysts 708B and 709B (catalyst ratio 1:1 by weight) (39.3 gm catalyst/gallon of the varnish system) were then allowed into the impregnation tank so that the test specimens were completely immersed. The thus constituted material was held under the same vacuum conditions as above for one hour. Nitrogen gas was allowed to flow into the tank until a pressure of 24 psi (0.165 MPa) was attained and held there for one hour. The resin was allowed to flow out of the chamber and the residual pressure released. The specimen holder was removed from the tank and placed in an oven for three hours at 150° C.

All specimens were tested for their dielectric breakdown voltage. All specimens were tested in accordance with ASTM D-149 Standard Test Methods for Dielectric Breakdown Voltage and Dielectric Strength of Electrical Insulating Materials at Commercial Power Frequencies with a continuous rate of voltage rise of 500 volts per second until breakdown. The outer electrode was a carefully wrapped length of 1-inch (2.54 cm) wide aluminum foil. The inner electrode was the GP-200 formed magnet wire over which the sleeving assemblies had been slipped. All specimens were preconditioned for 24 hours at 50%±5% relative humidity, and 23° C. ±1° C. before dielectric breakdown tests were performed. The specimens were prepared and tested in a random method to eliminate the possible effects of equipment drift, preferential treatment, or other unrecognized time related variables. The results of the testing are shown in the Table.

From these results, it can be seen that the Heavy Wall material of Example 2 is comparable to, and on average out-performs the conventionally used material of Example 3. As evidenced by the results shown in Example 1, even a thinner walled material than conventionally used had good dielectric strength. Although the dielectric strengths for the specimens of Example 4 exceeded the specimens of the present invention as indicated by Examples 1 and 2, it should be noted that the specimens of Example 4 contained an additional layer of fiberglass sleeving insulating not present in any of the other examples.

In addition to its high dielectric strength, the unitary sleeving according to the present invention provides a method of insulating coil leads which is not highly labor intensive and which does not rely heavily on operator skill and conscientiousness. The unitary electrical insulating sleeving allows coil manufacturers to use only a unitary length of sleeving to insulate electrical leads without having to resort to multiple steps such as the telescoping of several lengths of sleeving to attain adequate mechanical as well as electrical protection. Also, there is no danger of slippage in the relative layers as could be prevalent, for example with the material of Examples 3 and 4, thus having the potential to reduce these dielectric values. And the system according to the present invention is fully compatible with the VPI system. It should also be noted that while this invention has been primarily described in terms of advantageous use with VPI processing, it also has similar advantages in conjunction with other processing operations such as varnish dipping operations.

TABLE

| Example | Dielectric Breakdown Voltage (KV) | Average Value (KV) |
|---|---|---|
| 1 | 15.25 | 16.75 |
|   | 17.50 |   |
|   | 17.50 |   |
|   | 17.25 |   |
|   | 16.25 |   |
|   | 17.50 |   |
| 2 | 18.50 | 19.00 |
|   | 17.75 |   |
|   | 20.00 |   |
|   | 20.25 |   |
|   | 18.50 |   |
| 3 | 19.25 | 18.45 |

TABLE-continued

| Example | Dielectric Breakdown Voltage (KV) | Average Value (KV) |
|---|---|---|
|   | 17.75 |   |
|   | 18.25 |   |
|   | 18.75 |   |
|   | 18.25 |   |
| 4 | >25 | >25 |
|   | >25 |   |
|   | >25 |   |
|   | >25 |   |
|   | >25 |   |

Although this invention has been shown and described with respect to detailed embodiments thereof, it will be understood by those skilled in the art that various changes in form and detail thereof may be made without departing from the spirit and scope of the claimed invention.

We claim:

1. Electrically insulating sleeving material comprising an electrically insulating inner layer overcoated with an electrically insulating polymer, and a layer of fibrous insulation overbraided on the insulating polymer, the entire sleeving impregnated with a polymer binder so as to produce a unitary insulating sleeving with high dielectric strength, flexibility, and resistance to slippage.

2. The sleeving of claim 1 wherein the inner layer is woven fiberglass, the insulating polymer is acrylic polymer, and the fibrous insulation is fiberglass.

3. An electrical coil lead insulated with an electrically insulating sleeving material, the improvement comprising as the electrically insulating sleeving a material having an electrically insulating inner layer overcoated with an electrically insulating polymer, and a layer of fibrous insulation overbraided on the insulating polymer, the entire sleeving impregnated with a polymer binder so as to produce a unitary insulating sleeving with high dielectric strength, flexibility, and resistance to slippage.

4. The insulated coil lead of claim 3 wherein the inner layer is woven fiberglass, the insulating polymer is acrylic polymer, and the fibrous insulation is fiberglass.

5. The insulated coil lead of claim 3 additionally coated with VPI resin or dip varnish.

* * * * *